United States Patent [19]

Norman et al.

[11] Patent Number: 5,373,901

[45] Date of Patent: Dec. 20, 1994

[54] ENCAPSULATED BREAKERS AND METHOD FOR USE IN TREATING SUBTERRANEAN FORMATIONS

[75] Inventors: Lewis R. Norman, Duncan; Steve B. Laramay, Marlow, both of Okla.

[73] Assignee: Halliburton Company, Duncan, Okla.

[21] Appl. No.: 98,086

[22] Filed: Jul. 27, 1993

[51] Int. Cl.$^5$ .............................................. E21B 43/26
[52] U.S. Cl. ..................................... 166/300; 166/308
[58] Field of Search ...................... 166/280, 300, 308; 252/8.551, 8.553; 428/403, 404, 402.22, 402.24

[56] References Cited

U.S. PATENT DOCUMENTS

| | | |
|---|---|---|
| 3,163,219 | 12/1964 | Wyant et al. . |
| 3,766,984 | 10/1973 | Nimerick ............................ 166/294 |
| 3,952,741 | 4/1976 | Baker . |
| 3,992,317 | 11/1976 | Brichard et al. ..................... 252/186 |
| 4,182,417 | 1/1980 | McDonald et al. ................. 252/295 |
| 4,202,795 | 5/1980 | Burnham et al. ............... 166/308 X |
| 4,211,668 | 7/1980 | Tate ...................................... 252/316 |
| 4,259,205 | 3/1981 | Murphey ............................. 166/294 |
| 4,343,363 | 8/1982 | Norton et al. ...................... 166/281 |
| 4,456,067 | 6/1984 | Pinner, Jr. ........................... 166/279 |
| 4,506,734 | 3/1985 | Nolte ................................... 166/308 |
| 4,532,123 | 7/1985 | Gardner . |
| 4,560,486 | 12/1985 | Hinkel ............................. 166/308 X |
| 4,564,070 | 1/1986 | Norton ................................ 166/295 |
| 4,604,218 | 8/1986 | Dawson ......................... 166/307 X |
| 4,610,795 | 9/1986 | Norris et al. ...................... 252/8.551 |
| 4,624,795 | 11/1986 | Dawson et al. .................. 252/8.553 |
| 4,670,166 | 6/1987 | McDougall et al. ............. 252/8.552 |
| 4,671,972 | 6/1987 | Schobel et al. . |
| 4,693,321 | 9/1987 | Royer ........................... 252/8.551 X |
| 4,741,401 | 5/1988 | Walles et al. ...................... 166/300 |
| 4,756,844 | 7/1988 | Walles et al. . |
| 4,770,796 | 9/1988 | Jacobs ............................. 166/307 X |
| 4,919,209 | 4/1990 | King ................................... 166/300 |
| 4,923,753 | 5/1990 | Walles et al. ................ 252/8.553 X |
| 5,110,486 | 5/1992 | Manalastas et al. ............. 252/8.551 |
| 5,164,099 | 11/1992 | Gupta et al. .................... 252/8.551 |

FOREIGN PATENT DOCUMENTS

| | | |
|---|---|---|
| 0193369 | 9/1986 | European Pat. Off. . |
| 0540204A2 | 5/1993 | European Pat. Off. . |
| PCT/01872 | 6/1985 | WIPO . |

OTHER PUBLICATIONS

Paper No. CIM/SPE 90-89 "Encapsulated Breaker For Aqueous Polymeric Fluids" M. King et al presented Jun. 10-13, 1990 in Calgary.

*Primary Examiner*—George A. Suchfield
*Attorney, Agent, or Firm*—Robert A. Kent

[57] ABSTRACT

The present invention relates to a method of breaking an aqueous fracturing fluid comprising introducing said aqueous fracturing fluid into contact with an encapsulated breaker said encapsulated breaker comprising an aqueous fluid soluble breaker for said fracturing fluid encapsulated within a membrane comprising a partially hydrolyzed acrylic crosslinked with either an aziridine prepolymer or a carbodiimide, said membrane having imperfections through which an aqueous fluid can diffuse, such that an aqueous fluid in said fracturing fluid can diffuse through said membrane, dissolve at least a portion of said breaker and diffuse outward from said encapsulated breaker to contact and break the fracturing fluid in contact therewith.

20 Claims, 1 Drawing Sheet

ENCAPSULATED BREAKERS AND METHOD FOR USE IN TREATING SUBTERRANEAN FORMATIONS

BACKGROUND OF THE INVENTION

1. Field of the Invention

The present invention relates to compositions and methods for treating subterranean formations. Specifically, the invention is directed to compositions used to break fracturing fluids utilized in the stimulation of subterranean formations.

2. Description of the Prior Art

It is common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and applying sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Usually a gel, an emulsion or a foam, having a proppant such as sand or other particulate material suspended therein is introduced into the fracture. The proppant is deposited in the fracture and functions to hold the fracture open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows along the created fracture. Generally, a gelation agent and/or an emulsifier is used to gel or emulsify the fracturing fluid to provide the high viscosity needed to realize the maximum benefits from the fracturing process.

After the high viscosity fracturing fluid has been pumped into the formation and fracturing of the formation occurred, it is desirable to remove the fluid from the formation to allow hydrocarbon production through the new fractures. Generally, the removal of the highly viscous fracturing fluid is realized by "breaking" the gel or emulsion or, in other words, by converting the fracturing fluid into a low viscosity fluid. Breaking the gelled or emulsified fracturing fluid has commonly been accomplished by adding a "breaker," that is, a viscosity-reducing agent, to the fracturing fluid prior to pumping into a subterranean formation. However, this technique can be unreliable and sometimes results in incomplete breaking of the fluid and/or premature breaking of the fluid before the fracturing process is complete. Premature breaking can decrease the number or length of fractures obtained and thus, the amount of hydrocarbon recovery. Further, it is known in the art that most fracturing fluids will break if given enough time at an elevated temperature. However, it is, of course, most desirable to return the well back to production as quickly as possible.

It has been demonstrated that the viscosifying polymer in a fracturing fluid is concentrated by a factor of from 5 to 20 times due to fluid loss during pumping and fracture closure. This concentrated polymer generally is referred to as "filter cake." For example, see G. S. Penney, "An Evaluation Of The Effects Of Environmental Conditions In Fracturing Fluids Upon The Long Term Conductivity Of Proppants," SPE 16900, presented at the 62nd Annual Technological Conference of SPE, Dallas, Tex., Sep. 27-30, 1987. Further, others have emphasized the effects of filter cake upon conductivity. For example, M. A. Parker and B. W. McDaniel, "Fracturing Treatment Designs Improved By Conductivity Measurements Under Insitu Conditions," SPE 16901, presented at the 62nd Annual Technological Conference of SPE, Dallas, Tex., Sep. 27-30, 1987; B. W. McDaniel and M. A. Parker, "Accurate Design and Fracturing Treatment Refines Conductivity Measurement At Reservoir Conditions," SPE 17541, presented at SPE Rocky Mountain Regional Meeting, Casper, Wyo., May 11-13, 1984. An unencapsulated breaker dissolves in the fluid and is lost along with the fluid during fluid loss. The dissolved breaker does not concentrate along with the filter cake concentration of the polymer and thus may not effectively break the filter cake. Therefore, damage to the resulting propped fracture may be permanent unless breaking subsequently occurs due to temperature degradation or dilution with formation fluids.

There have been several proposed methods for the breaking of fracturing fluids which were aimed at eliminating the above problems. For example, U.S. Pat. No. 4,202,795 discloses a method to release a chemical into an aqueous fluid by combining the chemical with a solid hydratable gelling agent and a breaker for the gel formed by the gelling agent when hydrated. The mixture is formed into prills or pellets, preferably having a size and range of from about 20 to about 40 mesh. (U.S. Sieve Series) From combining the pellets with an aqueous fluid into which the chemical is to be released, the gelling agent in the pellets hydrates and forms a protective gel around each of the pellets which prevents the release of the chemical into the aqueous fluid for the time period required for the protective gel to be broken by the gel breaker in the pellets. Once the gel breaker has broken the protective gel, the chemical in the pellets is released into the aqueous fluid. The time required for the protective gel to be broken is varied by varying the quantities of hydratable gelling agent and the gel breaker utilized in the pellets and by using different gelling agents and gel breakers.

U.S. Pat. No. 4,506,734 also provides a method for reducing the viscosity and the resulting residue of an aqueous or oil based fluid introduced into a subterranean formation by introducing a viscosity-reducing chemical contained within hollow or porous, crushable and fragile beads along with a fluid, such as a hydraulic fracturing fluid, under pressure into the subterranean formation. When the fracturing fluid passes or leaks off into the formation or the fluid is removed by back flowing, any resulting fractures in the subterranean formation close and crush the beads. The crushing of the beads then releases the viscosity-reducing chemical into the fluid. This process is dependent upon the closure pressure of the formation to obtain release of the breaker and is thus, subject to varying results dependent upon the formation and its closure rate.

U.S. Pat. No. 4,741,401 discloses a method for breaking a fracturing fluid comprised of injecting into the subterranean formation a capsule comprising an enclosure member containing the breaker. The enclosure member is sufficiently permeable to at least one fluid existing in the subterranean environment or injected with the capsule such that the enclosure member is capable of rupturing upon sufficient exposure to the fluid, thereby releasing the breaker. The patent teaches that the breaker is released from the capsule by pressure generated within the enclosure member due solely to the fluid penetrating into the capsule whereby the increased pressure caused the capsule to rupture, i.e., destroys the integrity of the enclosure member, thus releasing the breaker. This method for release of the breaker would result in the release of substantially the total amount of breaker contained in the capsule at one particular point in time.

In another method to release a breaker, U.S. Pat. No. 4,770,796 teaches or suggest an acid fracturing fluid composition comprising a polymer, a crosslinking agent for said polymer, an aqueous acid and a breaker compound capable of coordinating with titanium or zirconium crosslinking agent. The breaker compound is encapsulated in a composition comprising a cellulosic material and a fatty acid and optionally a wax.

Further, U.S. Pat. No. 4,919,209 discloses a proposed method for breaking a fluid. Specifically, the patent discloses a method for breaking a gelled oil fracturing fluid for treating a subterranean formation which comprises injecting into the formation a breaker capsule comprising an enclosure member enveloping a breaker. The enclosure member is sufficiently permeable to at least one fluid existing in the formation or in the gelled oil fracturing fluid injected with the breaker capsule, such that the enclosure member is capable of dissolving or eroding off upon sufficient exposure to the fluid, thereby releasing the breaker.

U.S. Pat. No. 5,164,099 discloses a proposed method for breaking a fluid utilizing a percarbonate, perchlorate or persulfate breaker encapsulated with a polyamide. The polyamide membrane is permeable to at least one fluid in the formation which dissolves the breaker and the breaker then diffuses through the membrane to break the fracturing fluid with the membrane staying intact during the breaker release.

There remains a need for a method for the controlled breaking of fracturing fluids which is more economical and provides not only controlled release of the breaker, but also reduces damage to the formation and facilitates well clean-up.

SUMMARY OF THE INVENTION

The present invention relates to a method for controllably breaking an aqueous based fracturing fluid utilized to stimulate a subterranean formation. The present invention is further directed to an encapsulated breaker which is capable of providing controlled release at elevated pH in aqueous-based fracturing fluids. The encapsulated breaker is enclosed within an inert membrane that is permeable to at least one fluid present in a subterranean formation or to a carrier fluid introduced into a subterranean formation with the encapsulated breaker whereby the fluid permeates the encapsulated breaker and causes the breaker to diffuse through voids in the membrane and into the fracturing fluid. The membrane stays substantially intact during the period of release of the breaker, thereby providing controlled release.

Using the method of the present invention there is provided a means of slowly releasing amounts of a breaker over time instead of a single release of the total or a substantial quantity of breaker from an encapsulated breaker. The present method provides an encapsulation membrane which is capable of functioning in an aqueous based fluid at temperatures of from 60° F. to about 300° F. and at a fluid pH of up to at least about 12 without premature release of the breaker into the fluid.

In addition, as the load water is returned to the wellbore upon completion of the treatment, the breaker capsules can continue to release breaker into any filter cake which is present to assist in dissolving and removing the filter cake from the formation as well as any viscosified fracturing fluid present.

DESCRIPTION OF THE PREFERRED EMBODIMENT

Figure 1:
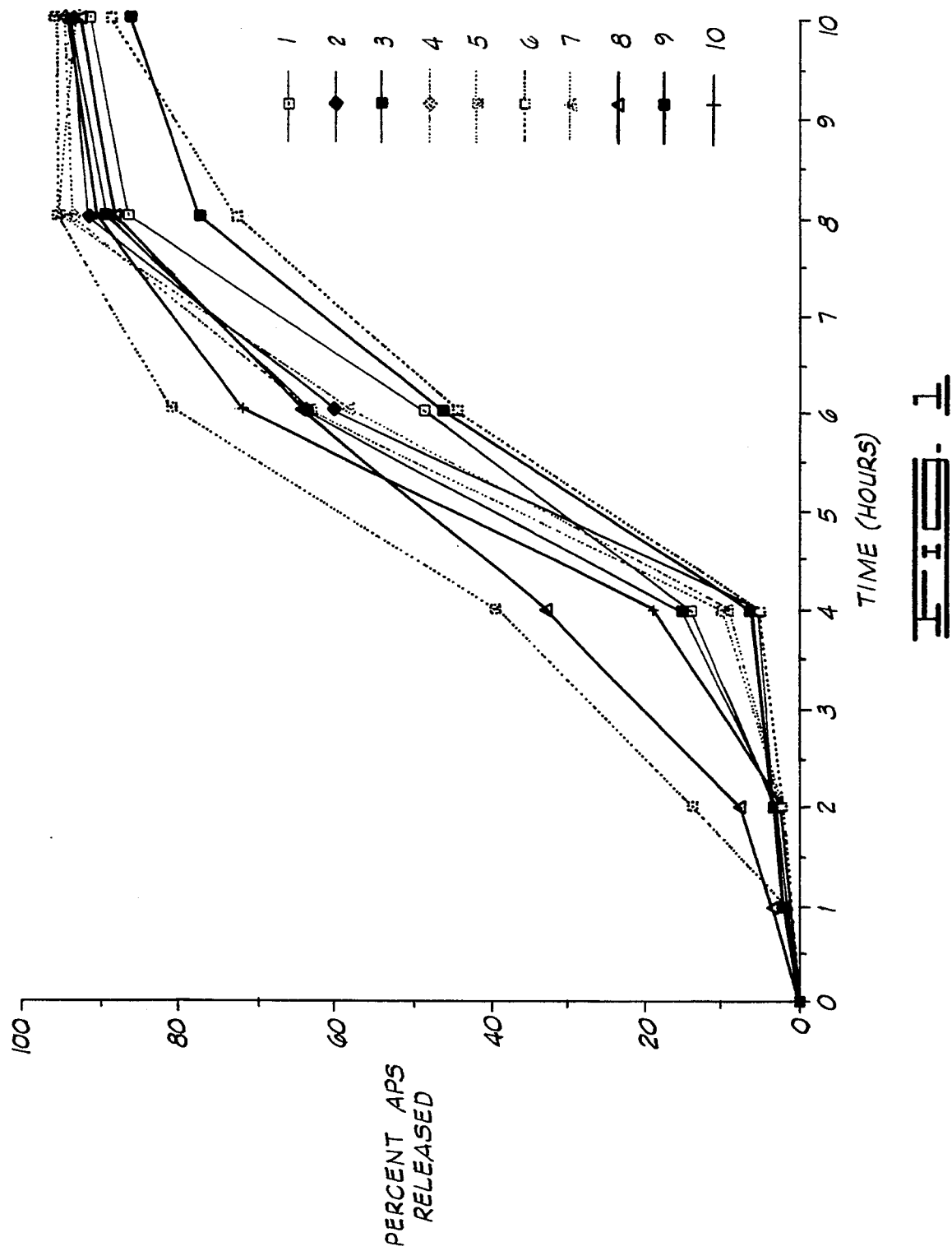
FIG. 1 is a graphical illustration of the dissolution profiles of single particles of the encapsulated material.

The method and composition of the present invention provides a means of breaking an aqueous linear or crosslinked fracturing fluid used to stimulate a subterranean formation.

The crosslinked fracturing fluid is prepared by hydrating a polymer such as guar, hydroxyalkylguar, hydroxyalkylcellulose, carboxyalkylhydroxyguar, carboxyalkylhydroxyalkylguar, cellulose or other derivatized cellulose, xanthan and the like in an aqueous fluid to which is added a suitable crosslinking agent. Suitable crosslinking agents include compounds such as borates, zirzonates, titanares, pyroantimonates, aluminates and the like. Generally, the encapsulated breaker of the present invention can be added to any aqueous fracturing fluid generally known in the art. In the practice of the present invention the encapsulated breaker can be injected with the fracturing fluid or, if added to a carrier fluid, injected into a subterranean formation prior to, simultaneously with or subsequent to injection of the fracturing fluid. Generally, the encapsulated breaker will be admixed with the fracturing fluid prior to introduction into the subterranean formation. If a carrier fluid is utilized, it can comprise substantially any of the aqueous liquids utilized to form fracturing fluids.

The encapsulated breaker of the present invention is made using known microencapsulation techniques. The encapsulated breaker can be made utilizing a fluidized bed process. One version of this method is referred to as the Würster process and a modification of such process utilizes a top spray method. Equipment to effect the coating is available from, for example, Glatt Air Techniques, Inc. Ramsey, N.J.

The breaker which is enclosed by the encapsulant can be substantially any material which does not adversely interact or chemically react with the encapsulation coating to destroy its utility. The breaker material can comprise, for example, enzymes such as hemicellulase, oxiders such as sodium or ammonium persulfate, organic acids or salts, such as citric acid or a citrate, fumaric acid, liquids adsorbed on a solid substrate, solid perborates, solid peroxides or other oxidizers, mixtures of two or more materials and the like.

The encapsulating material comprises a partially hydrolized acrylic, preferably in an aqueous based form which is crosslinked with either an aziridine prepolymer or a carbodiimide. More particularly, the term partially hydrolyzed acrylic as used herein means any of the vinyl acrylic latex polymers containing from about 0-60% by weight monovinyl aromatic content as styrene, from about 5-25% by weight alpha, beta unsaturated carboxylic acid content and from about 15-95% by weight alkyl acrylate or methacrylate ester content. The unsaturated carboxylic acid can comprise, for example acrylic acid or methyl acrylic acid or mixtures thereof. The alkyl acrylate or methacrylate ester can comprise, for example, ethyl butyl or 2-ethylhexylacrylate, methyl, butyl or isobutyl methacrylate or mixtures thereof. The vinyl acrylic latex polymers are stabilized by the addition Of appropriate nonionic or anionic/nonionic surfactant systems in accordance with well known methods for preparing and stabilizing latex polymer systems. Vinyl acrylic latex polymers of the type described above are commercially available from, for example, Rohm and Haas Company, Philadelphia, Pa. or S. C. Johnson Wax, Racine, Wis.

The aziridine prepolymer can comprise, for example, pentaerythritol-tris-[$\beta$-(aziridinly) propionate]. The carbodiimide can comprise, for example, 1,3-dicyclohexylcarbodiimide.

The partially hydrolyzed acrylic encapsulating material preferably is admixed with a particulate micron sized material such as silica prior to or simultaneously with coating of the breaker. The acrylic is admixed with the particulate silica in an amount such that the particulate comprises from about 0 to about 60 percent by weight of coating solids present. Preferably, the silica comprises from about 30 to about 50% by weight of coating solids present. The particulate silica can have a size range of from about 1 micron to about 15 microns. Preferably the silica has a median particle size of from about 2 to about 3 microns and preferably contains less than 33 percent, by weight, sub-micron sized particles. The presence of substantial quantities of sub-micron sized particles has been found to adversely effect the performance of the encapsulated breaker of the present invention resulting in unregulated release of large quantities of breaker after exposure to a fracturing fluid.

The crosslinking agent is admixed with the partially hydrolyzed acrylic and silica in an amount of from about 0.5 to about 10 percent by weight of total coating solids present- Preferably, the crosslinking agent is present in an amount of from about 2.5 to 3.5 percent by weight of total coating solids.

When utilized in a fluidized bed coating process the encapsulated breaker coating is advantageously utilized in the form of an aqueous or solvent-based solution or dispersion which sometimes may be referred to as a latex which may contain from about 40 to about 55 percent by weight solids to facilitate spray coating of the breaker. Preferably the encapsulated breaker will have an encapsulant coating in an amount of from about 10 to about 50 percent by weight of the encapsulated breaker. Preferably, the coating will comprise from about 20 to about 40 percent by weight of the encapsulated breaker depending upon the rate of release desired.

In the practice of the present invention, depending upon the temperature of the formation to be treated and the desired break time of the fracturing fluid, the encapsulated breaker may be present in an amount of from about 0.1 to in excess of 50 pounds per 1000 gallons of fracturing fluid. The encapsulated breakers of the present invention also may be utilized in a fracturing fluid with quantities of unencapsulated breakers, depending upon the specific break time desired.

As previously indicated, the encapsulated breakers are made by well known fluidized bed encapsulation techniques wherein the particles of breaker are sprayed with the encapsulant while suspended in a flow of air or other gas within a spray chamber. To maintain product uniformity with respect to performance, prior to encapsulation of the breaker material, the breaker preferably is sized to remove a substantial portion of any fines or clumps of breaker particles. In this manner, the subsequently prepared encapsulated breaker will have, within a relatively narrow range, a similar membrane coating wall thickness and exhibit generally similar breaker release control properties. Generally, the encapsulated breaker is prepared having a membrane coating of the crosslinked partially hydrolyzed acrylic and silica emulsion coating mixture of a certain thickness and peroneability to obtain the desired controlled release of the breaker for a particular fracturing fluid. The quantity of and size of the particulate silica present in the sprayed coating will significantly effect the permeability of the membrane created. The size of the encapsulated breaker varies depending upon the desired amount of breaker to be released and the desired rate at which the breaker is to be released. For example, the thicker the membrane, generally the slower the release since it takes longer for the aqueous fluid in the fracturing fluid to permeate the encapsulated breaker and effect dissolution of the breaker and diffusion back through the coating. This however can be modified by changing the particle size of the silica present in the coating. Generally, it is preferred that the size of the encapsulated breaker particles should be close to or smaller than that of the proppant, if any, present in the fracturing fluid. This further minimizes any formation damage that may result from introduction of the fracturing fluid into a subterranean formation. However, it is to be understood that particles having a size larger than the proppant also may be utilized.

In the present invention, the breaker encapsulated within the coating membrane is released from within the membrane by diffusion. Fluid moves from outside the membrane through the membrane coating and into the core of the particle whereupon it dissolves the breaker. The breaker solution concentration within the membrane slowly becomes greater than the breaker solution concentration outside the membrane and the breaker diffuses through the membrane and into the fracturing fluid whereupon it subsequently breaks the fracturing fluid.

The addition of the in-excess-of one micron mean diameter particles to the partially hydrolyzed acrylic coating creates imperfections in the coating in the form of small weep-holes or channels that facilitate the diffusion process. While the specific description set forth hereinabove has referred to particulate silica as the particulate additive to the coating, it is believed that any inert particulate of a similar particle size also could be utilized. The silica merely represents one commercially available preferred material. Examples of other suitable particulates would include calcium carbonate, titanium dioxide, barium sulfate and calcium sulfate or the like.

The encapsulated breaker of the present invention has been surprisingly discovered to exhibit effective release rate control at pH's above 7. The release rate control is believed to result from the use of the crosslinker with the partially hydrolyzed acrylic. The crosslinking process is believed to prevent or assist in minimizing the caustic "swelling" of acrylics which is well known to those individuals skilled in the art of applying acrylic-type film coatings. The crosslinked coating has been found to effectively control the rate of release of the breaker when contained in an aqueous fracturing fluid having a pH of from about 2 to about 12.

The controlled release of the breaker from the encapsulated breaker of the present invention is effected without rupture of the coating membrane occurring during the period in which a majority of the breaker has been released. The breaker is released either by contact with the aqueous fluid contained in the fracturing fluid or any other aqueous fluid which may contact the encapsulated breaker within the subterranean formation or wellbore penetrating the formation.

To further illustrate the present invention, and not by way of limitation, the following Examples are presented.

EXAMPLE I

About 1000 grams of 20–50 mesh (U.S. Sieve Series) ammonium persulfate obtained from FMC Corporation are placed in a Versaglatt GPCG I fluidized bed apparatus. The Versaglatt unit was set up to provide top spray by insertion of a top spray insert and a three micron filter bag was utilized. The spray nozzle was placed in the lower position on the top spray insert. A 1.2 mm nozzle was utilized. The coating material was applied at a coating agent temperature of 35° C., an atomizing air pressure of 2.0 bar, an air rate of 3–4 m/sec. and a spray flow rate of 15 ml/min. After the coating agent was applied, the encapsulated material was heated to a temperature of about 42° C. for a period of about 10 minutes and then cooled to room temperature. The coating agent was prepared by adding 182 grams of water to 790 grams of the partially hydrolyzed acrylate/silica mixture of the present invention. The mixture contained 26.8% silica, by weight, and 28.4% acrylate resin. Thereafter, 28 grams of a crosslinker comprising an aziridine prepolymer, present as a 50% solution, was added to the mixture and the coating then was applied. Using the above formulation, an encapsulated product was produced having a 31%, by weight, coating.

The release profile of the sample was determined using the following procedure. A 0.5 inch diameter, 12 inch long column was fitted with end plugs and a fine mesh screen. A sample comprising 2.9 grams of the encapsulated breaker and 112 grams of 20/40 mesh Ottawa sand was packed into the column above the screen. The column temperature was maintained at 175° F. with electrical heating tapes. The column was fitted with ⅛ inch ID stainless steel flow lines and a back pressure regulator was installed in the downstream side. The regulator was set at 1000 psi. The upstream side was connected to a low rate duplex pump to drive the test fluid through the test column. Approximately 20 feet of ⅛ inch tubing was contained in a constant temperature bath set at 175° F. to preheat the test fluid. The test fluid was pumped through the system at a rate of 2 milliliters per minute. The test fluid was prepared by adding sodium carbonate to a solution containing water, 0.2% by volume tetramethylammonium chloride, 0.001% by volume "LOSURF 300", a proprietary nonionic surfactant of Halliburton Energy Services, Duncan, Okla. which primarily comprises an alkyloxylated nonylphenol formaldehyde resin blend in an isopropyl alcohol/heavy aromatic naphtha carrier and 0.012% by weight "POLYBOR ®", a commercially available admixture of borax and boric acid of U.S. Borax and Chemical Corporation, Los Angeles, Calif. until a pH of 10 was achieved. The test fluid was collected and samples were analyzed for persulfate using iodometric titration methods. The release profile is set forth below in Table I.

TABLE I

Release Profile For Encapsulated Ammonium Persulfate At 175° F. and 1000 psi

| Time, Hours | Ammonium Persulfate released, % |
|---|---|
| 0.33 | 0.91 |
| 0.67 | 6.01 |
| 1.00 | 10.5 |
| 1.50 | 16.5 |
| 2.00 | 18.4 |
| 2.50 | 23.5 |
| 3.00 | 28.6 |
| 4.00 | 37.3 |
| 5.00 | 43.7 |
| 6.00 | 48.6 |
| 24.0 | 77.0 |

EXAMPLE II

To determine the effect of the crosslinking agent upon the release profile of the encapsulated breaker in elevated pH fluids, the following tests were performed. A sample of encapsulated breaker was prepared by the method of Example I without the crosslinker and with the crosslinker. 0.2 grams of the encapsulated sample having a 20% by weight coating was placed in 50 milliliters of the test fluid of Example I. The fluid was preheated to 150° F. and thereafter maintained at that temperature in a constant temperature bath. At the times indicated in Table II, a 10 milliliters aliquot was removed from each sample and the persulfate content was determined using iodometric titration. The remaining test fluid of the sample was filtered from the encapsulated breaker, the breaker particles were rinsed with deionized water and added to a fresh 50 milliliter sample of the test fluid and replaced in the constant temperature bath. The procedure was repeated for each test cycle. The cumulative release of the breaker is set forth in the Table, below:

TABLE II

| Crosslinker Present | % Ammonium Persulfate Released At Time, Hours | | | |
|---|---|---|---|---|
| | 1 | 2 | 3 | 4 |
| NO | 22.6 | 42.0 | 53.5 | 61.9 |
| YES | 10.7 | 18.6 | 26.7 | 37.0 |

The foregoing results clearly demonstrate the effect the presence or absence of the crosslinker in the coating agent has upon the release profile of the encapsulated breaker.

EXAMPLES III

To determine the effect of the concentration of the crosslinker in the coating agent, the following test was performed. Samples were prepared as in Example I having the crosslinking agent concentration set forth in Table III. The test procedure of Example II was utilized and the percent of ammonium persulfate released at one hour was determined. Sample coating was 20% by weight. The results are set forth below:

TABLE III

| Crosslinking Agent Concentration, % | % Ammonium Persulfate Released in 1 Hour |
|---|---|
| 0.00 | 14.7 |
| 2.70 | 5.18 |
| 5.40 | 5.18 |
| 10.8 | 8.80 |

The results clearly demonstrate that the presence of optimal crosslinker concentrations reduces the rate of release of the breaker from the encapsulated breaker and provides a means of regulating the rate of release from the encapsulated breaker.

EXAMPLE IV

To determine the effect the particulate concentration in the coating has upon the release rate of the ammonium persulfate from the encapsulated breaker samples were prepared by the method of Example I with the particulate concentration set forth below. The particulate comprised silica with a 2.1 mean particle diameter. The samples had a 20% coating, by weight, of partially hydrolyzed acrylic. The test procedure of Example II was utilized. The results are set forth below in Table IV.

TABLE IV

| Particulate Concentration In Coating % | % Ammonium Persulfate Released At Time, Hours | |
|---|---|---|
| | 1 | 2 |
| 0 | 4.14 | 15.8 |
| 13.9 | 4.71 | 10.5 |
| 23.2 | 2.72 | 7.43 |
| 38.8 | 2.97 | 8.63 |
| 41.8 | 2.20 | 13.2 |
| 44.5 | 2.02 | 16.3 |
| 48.0 | 2.79 | 18.2 |
| 51.2 | 2.79 | 30.7 |

The results of the tests clearly demonstrate that the presence of the particulate in the coating effects the rate of encapsulated material release.

EXAMPLE V

To illustrate the method of release of the breaker from the encapsulated breaker, the following tests were performed. Ten individual particles of the encapsulated breaker prepared in accordance with Example I were weighed and placed in individual 8 milliliter test tubes containing 2 milliliters of a dissolution medium comprising deionized water containing 0.01% by volume of a surfactant identified as "LOSURF 300". The test tubes were sealed with a teflon-lined screw cap and the bottles were placed in a rotating bottle apparatus set at 50 RPM and they were maintained at 65° C. A 1 milliliter sample was removed from each test tube at 1, 2, 4, 6 and 10 hours. Fresh 1 milliliter aliquots of the dissolution medium were added to each test tube to replace the volume removed. The samples were analyzed for ammonium content using an ammonium ion-selective electrode ("ORION MODEL 95-12" ammonium sensing electrode) connected to an ion meter ("ORION MODEL 811" Ion Meter). The samples were analyzed immediately after removal from the test tubes. The results are set forth in FIG. 1 which sets forth the percent of ammonium persulfate released as a function of time of the test. The results set forth in FIG. 1 clearly illustrate the controlled diffusion of the breaker from the encapsulated material.

EXAMPLE VI

To illustrate the method of release of the breaker from the encapsulated material under elevated temperature and pressure conditions such as exist in a subterranean formation, the following test was performed.

A single particle of the encapsulated material was placed in a stainless steel visual cell having top and bottom windows which were capable of operation at elevated temperature and pressure. The particle was suspended in the center portion of the cell on a glass slide. The cell was illuminated with a 100 watt quartz halogen light source used in a transmitted mode. An "OLYMPUS STEREOSCOPE SZ 60" microscope was used to observe the particle of encapsulated breaker during the test at a 50× magnification. The cell was filled with a solution comprising 5% potassium iodide in deionized water. The potassium iodide reacts with the persulfate upon contact to give a brown color, thus providing a visual indicator of contact with persulfate. The cell was pressurized to 2000 psig and heated to a temperature of 180° F. ±2° F. with an electrical heating plate using a thermocouple probe located within the cell and a Eurotherm programmable controller. The temperature increased within the cell from ambient (about 80° F.) to 180° F. at a rate of about 7° F. per minute and the final temperature was attained after about 15 minutes. The particle in the cell then was observed and observations were recorded at the start and at 30 minute intervals for 4 to 6 hours. The observations are set forth below in Table VI.

TABLE VI

| Test 1 | |
|---|---|
| Time, hours | Observation |
| 0 | particle appears to be a clear, transparent, slightly angular, speckled crystal |
| 30 | particle appears uniformly light brown and shows slight rounding of coating, no visible rupture |
| 60 | particle appears medium brown, solution in area of particle becoming slightly brown, no rupture visible |
| 90 | particle becoming more brownish in color, diameter increased by about 7%, no rupture visible |
| 120 | particle still darkening, solution becoming more brownish, particle more spherical with diameter increase of about 5%, no rupture visible |
| 150 | particle very dark, almost opaque, with very spherical shape and approximately 8% diameter increase |
| 180 | particle very dark and solution much darker, no rupture |
| 210 | particle opaque, no visible increase in size, solution still increasing in brown color, no rupture |
| 240 | particle opaque, no changes from 210 minutes |

The test was repeated with a second randomly selected particle having an appearance similar to the first particle.

TABLE VI

| Test 2 | |
|---|---|
| Time, minutes | Observation |
| 0 | particle appears clear with speckled coating on crystal |

TABLE VI-continued

Test 2

| Time, minutes | Observation |
|---|---|
| 30 | particle light brown in color, no change in size |
| 60 | particle darker, no change in size, no rupture of coating |
| 90 | particle has become darker brown, diameter increased by approximately 5% as particle becomes more spherical, solution around particle becoming brown colored |
| 120 | particle still darkening, diameter unchanged, dark colored solution slowly exuding from at least 2 sites on particle into solution, surrounding solution becoming more brownish in color, no visible rupture |
| 150 | particle opaque, diameter unchanged, continuing to exude brownish solution from sites on particle, solution becoming darker, no rupture |
| 180 | particle is opaque, solution still darkening |
| 210 | particle opaque, solution still darkening, diameter unchanged, no rupture |
| 240 | particle and solution unchanged |
| 270 | particle and solution unchanged |
| 300 | particle and solution unchanged |
| 330 | particle and solution unchanged |
| 360 | particle and solution unchanged |

While that which is considered to comprise the preferred embodiments of the present invention has been described herein, it is to be understood that various other modifications will be apparent to and can be readily made by those skilled in the art without departing from the spirit or scope of the present invention as set forth in the appended claims.

WHAT IS CLAIMED IS:

1. A method of breaking an aqueous fracturing fluid comprising introducing said aqueous fracturing fluid into contact with an encapsulated breaker said encapsulated breaker comprising an aqueous fluid soluble breaker for said fracturing fluid encapsulated within a membrane comprising a partially hydrolyzed acrylic crosslinked with either an aziridine prepolymer or a carbodiimide, said membrane having imperfections through which an aqueous fluid can diffuse, such that an aqueous fluid in said fracturing fluid can diffuse through said membrane, dissolve at least a portion of said breaker and diffuse outward from said encapsulated breaker to contact and break the fracturing fluid in contact therewith.

2. The method of claim 1 wherein said membrane remains substantially intact during the release of a substantial portion of said breaker.

3. The method of claim 1 wherein said breaker comprises at least one member selected from the group of sodium persulfate, ammonium persulfate, potassium persulfate, citric acid, fumaric acid, hemicellulase enzyme and perborates.

4. The method of claim 1 wherein at least a portion of said imperfections are created by the presence of an effective quantity of in excess of 1 micron sized particulate in said membrane.

5. The method of claim 4 wherein said micron sized particulate has a mean particle diameter of from 2 to about 3 microns and comprises silica.

6. The method of claim 4 wherein at least a portion of said micron sized material has a particle size in the range of from about 1 to about 15 microns.

7. The method of claim 4 wherein said aziridine prepolymer is present in an amount of from about 2.5 to about 3.5 percent by weight of said partially hydrolyzed acrylic and micron sized particulate.

8. The method claim 4 wherein said aziridine prepolymer is present in an amount of from about 0.5 to about 10 percent by weight of said partially hydrolyzed acrylic and micron sized particulate.

9. The method of claim 1 wherein said azridine prepolymer comprises pentaerythritol-tris-[$\beta$-(aziridinly) propionate].

10. The method of claim 1 wherein said fracturing fluid has a pH in the range of from about 2 to about 12.

11. A method of breaking an aqueous fracturing fluid having a pH in excess of about 7 and assisting in removing filter cake produced from said fracturing fluid within a subterranean formation comprising introducing into said formation to contact said fracturing fluid and filter cake in said formation an encapsulated breaker, said encapsulated breaker comprising a breaker for said fracturing fluid enclosed within a membrane comprising a partially hydrolyzed acrylic crosslinked with either an aziridine prepolymer or a carbodiimide, said membrane including an effective quantity of an in-excess-of 1 micron particulate to create imperfections in said membrane such that said breaker can diffuse through said membrane into the fracturing fluid to break the fracturing fluid.

12. The method of claim 11 wherein said membrane remains substantially intact during the release of a substantial portion of said breaker.

13. The method of claim 11 wherein said breaker comprises at least one member selected from the group of sodium persulfate, ammonium persulfate, potassium persulfate, citric acid, fumaric acid, hemicellulase enzyme and perborates.

14. The method of claim 11 wherein said micron sized particulate has a mean particle diameter of from about 2 to about 3 microns and comprises silica.

15. The method of claim 11 wherein said aziridine prepolymer comprises pentaerythritol-tris-[$\beta$-(aziridinly) propionate].

16. The method of claim 11 wherein said aziridine prepolymer is present in an amount of from about 0.5 to about 10 percent by weight of said partially hydrolyzed acrylic and micron sized particulate.

17. The method of claim 11 wherein said encapsulated breaker and fracturing fluid are introduced together into said subterranean formation.

18. A method of breaking an aqueous fracturing fluid and assisting in removing filter cake produced therefrom during treatment of a subterranean formation comprising introducing into said formation being fractured with at least a portion of said fracturing fluid an encapsulated breaker, said encapsulated breaker comprising an aqueous soluble breaker for said fracturing fluid encapsulated within a membrane comprising a partially hydrolyzed acrylic crosslinked with either an aziridine prepolymer or a carbodiimide, said membrane containing a diffusion effecting amount of an in excess of 1 micron sized silica particulate whereby imperfection are created in said membrane such that breaker dissolved by an aqueous fluid can diffuse from said encapsulated breaker to contact and break said fracturing fluid in contact therewith.

19. The method of claim 18 wherein said breaker comprises at least one member selected from the group of sodium persulfate, ammonium persulfate, potassium persulfate, citric acid, fumaric acid, hemicellulase enzyme and perborates.

20. The method of claim 18 wherein at least a portion of said micron sized material has a particle size in the range of from about 1 to about 15 microns.

* * * * *